United States Patent [19]
Ishida et al.

[11] Patent Number: 5,387,975
[45] Date of Patent: Feb. 7, 1995

[54] INTERFEROMETER FOR MEASURING A SURFACE CONFIGURATION OF A TEST OBJECT BY AN INTERFERENCE PATTERN USING GRATINGS TO GENERATE WAVE FRONTS

[75] Inventors: Futoshi Ishida, Sakai; Kiyofumi Hashimoto, Suita; Toshihide Dohi, Minoo; Takao Kobayashi, Takatsuki; Yutaka Tokuyama, Osaka, all of Japan

[73] Assignee: Minolta Co., Ltd., Osaka, Japan

[21] Appl. No.: 79,639

[22] Filed: Jun. 18, 1993

[30] Foreign Application Priority Data

Jun. 26, 1992 [JP] Japan .................................. 4-168825

[51] Int. Cl.⁶ .................................................. G01B 9/02
[52] U.S. Cl. ................................... 356/359; 356/360; 356/354
[58] Field of Search ............... 356/349, 354, 359, 360, 356/376, 345; 250/201.4, 561, 226

[56] References Cited

U.S. PATENT DOCUMENTS 4,585,349  4/1986  Gross et al. ........................ 356/375
4,848,907  7/1989  Yokokura et al. .
4,886,362 12/1989  Oono ................................... 356/349

FOREIGN PATENT DOCUMENTS 61-246634 11/1986  Japan .
61-272606 12/1986  Japan .

Primary Examiner—Samuel A. Turner
Assistant Examiner—Robert Kim
Attorney, Agent, or Firm—Price, Gess & Ubell

[57] ABSTRACT

An interferometer utilizing interference whose object is the measurement of the configuration of a test surface with high precision by allowing accurate positioning to a predetermined measuring position for the measurement of the configuration of the test surface.

The interferometer is equipped with an alignment pattern (4A) which generates a wave front that converges at the predetermined measuring position, as well as a wave front for measuring the configuration corresponding to the design configuration of the test surface (9), and by using a test surface-reflected beam of the wave front generated by the alignment pattern, an alignment observation optical system (8) measures the displacement of the test surface from the predetermined measuring position.

6 Claims, 5 Drawing Sheets

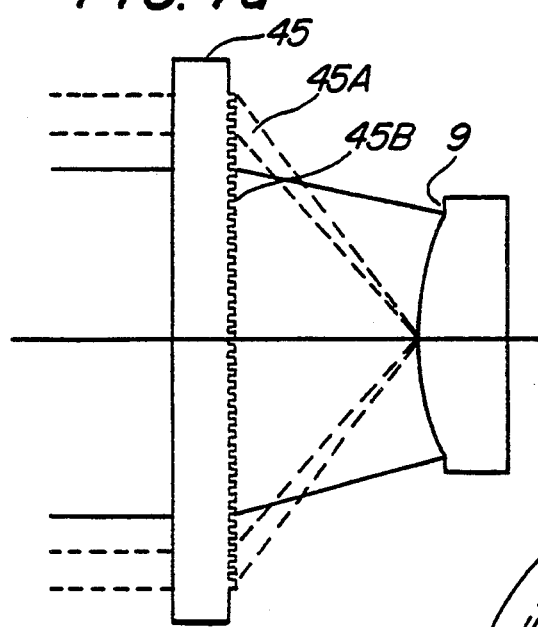
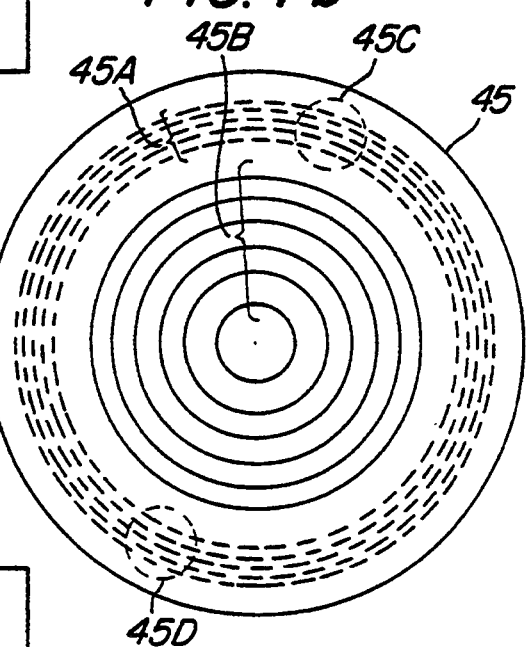
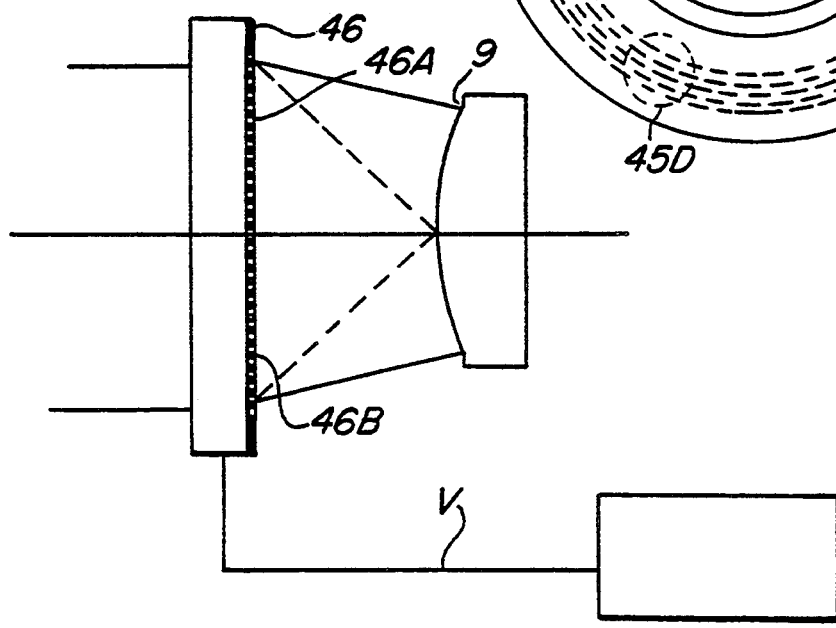

INTERFEROMETER FOR MEASURING A SURFACE CONFIGURATION OF A TEST OBJECT BY AN INTERFERENCE PATTERN USING GRATINGS TO GENERATE WAVE FRONTS

BACKGROUND OF THE INVENTION

1. Field of the Invention

The present invention relates to an interferometer for the precise measurement of the configurations of the surfaces of lenses, optical elements, etc., particularly the configurations of spherical and aspherical surfaces.

2. Description of the Prior Art

In general, an interferometer measures the configuration of a test surface using the interference pattern created by the reflected beam from the test surface of a test object and that from the reference surface. Such an interferometer is equipped with a test beam generator which forms a wave front corresponding to the design configuration of the test surface in order to obtain the reflected beam from the test surface. The wave front generated by the test beam generator is a spherical wave where the test surface is spherical, and an aspherical wave where it is aspherical.

Incidentally, innumerable virtual configurations exist for the wave front generated by the test beam generator depending on the distance from the generator. Naturally, the design configuration of the test surface is included in these virtual configurations. On the other hand, an interferometer normally requires that the test surface be positioned where the distortion of the interference pattern is smallest. This means that the test surface is positioned at one of the abovementioned virtual configurations. In other words, the position of the test surface is adjusted such that an interference pattern is formed by the reflected beam from the test surface, and this interference pattern is white (or black) only—a pattern termed 'one color'—or such that it comes closest to that condition.

Where the test surface is spherical, the measuring wave front corresponds to innumerable virtual spherical surfaces (including the design spherical surface). Therefore, if the test surface exactly matches the design spherical surface, naturally an interference pattern of one color may be obtained; it must be noted, however, that when the test surface coincides exactly with one of the innumerable virtual spherical surfaces, an interference pattern of one color is obtained as well. Similarly, where the test object has an aspherical surface, when the test surface coincides with one of the innumerable virtual aspherical surfaces, a one-color interference pattern is also obtained.

As a result, the information which can be obtained from the interference pattern amounts to 'the discrepancy between the test surface configuration and a certain virtual spherical surface' or 'the discrepancy between the test surface configuration and a certain virtual aspherical surface'. In the case of a spherical surface, the distortion of the interference pattern can be discovered separately by using a curvature prototype, a spherical surface measuring device, etc. However, in the case of an aspherical surface, there has been the problem that there are no such appropriate devices, and that the interference pattern obtained includes 'a discrepancy between the test surface configuration and a virtual aspherical surface' and 'a discrepancy between the design aspherical surface and a virtual aspherical surface', where 'the discrepancy between the test surface and the design aspherical surface' cannot be easily measured.

The present invention tries to obtain 'the discrepancy between the test surface configuration and the design configuration' only, by accurately positioning the test object at a predetermined measuring position. A device to accurately position the test object at a predetermined measuring position has long been suggested. For example, already known are devices such as (a) a device which has a position detection member in addition to a configuration measuring member and (b) a device which moves the test object to the measuring position after the vertex of the test surface is positioned at the point where the measuring wave converges.

First, one example of device (a) which is equipped with a position detection member is provided in Japanese Laid-open Patent Publication No. 61-246634. In this example, there is an alignment beam path in addition to the measuring beam path, and when alignment of the test object is performed, the measuring beam path is closed with a shutter so that the light is led into the alignment beam path and the test object is accurately set to the predetermined measuring position by analyzing the position of light converging on the area sensor.

With a device which moves the test object to the measuring position after positioning the vertex of the test surface at the point where the measuring wave converges, as suggested by (b), the vertex of the test surface is first positioned at the point where the measuring light converges, from which point the test object is then moved to the actual measuring position using a high-precision linear guiding mechanism.

However, when positioning the test object using the abovementioned devices, there have been such shortcomings as complex operation, time-consuming adjustment, and numerous device components.

Regarding device (a), which is equipped with a separate position detection member, components for alignment such as a shutter to switch the beam paths and a lens to converge the alignment light to the area sensor are required, and moreover, errors in manufacturing these components must be taken into consideration. As a result, not only do miniaturization and lower costs for the device become unattainable, but accuracy of measurement is also reduced.

Regarding device (b), because the test object must be moved strictly parallel to the optical axis, the degree of parallelization between the linear guiding mechanism and the optical axis and the reliability of the measurement of the position of the test object must be improved. For that purpose, a high-precision guiding mechanism is needed, which not only complicates the device but also increases the cost.

SUMMARY OF THE INVENTION

The object of the present invention is to provide an interferometer which can accurately position a test surface at a predetermined measuring position and measure the configuration of the test surface with high precision while limiting any increase in the number of alignment member component elements to the extent possible.

The interferometer of the present invention is characterized in that, in particular, a means to generate a first wave front for the measurement of the configuration of the test surface and a means to generate a second wave front which converges on the predetermined measuring position are integrated onto one optical element.

By emitting the second wave front into an area of the test surface which is less susceptible to manufacturing errors (for example, on the center of the optical axis of the test surface) and performing the positioning of the test surface at the predetermined measuring position using the reflected beam of the wave front, 'the discrepancy between the test surface configuration and the design configuration' is measured in such a way that there are no displacement errors from the predetermined measuring position.

In addition, by integrating the means to generate the first and second wave fronts on the same optical element, an increase in number of components may be avoided.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 7(a) and FIG. 7(b) are cross-sectional view of an optical element on which another pattern is formed outside the area of one pattern.

FIG. 8 is a cross-sectional view of an optical element on which a pattern is formed using liquid crystal.

DETAILED DESCRIPTION OF THE PREFERRED EMBODIMENTS

Embodiments of the present invention are described in detail below with reference to the drawings.

Figure 1:
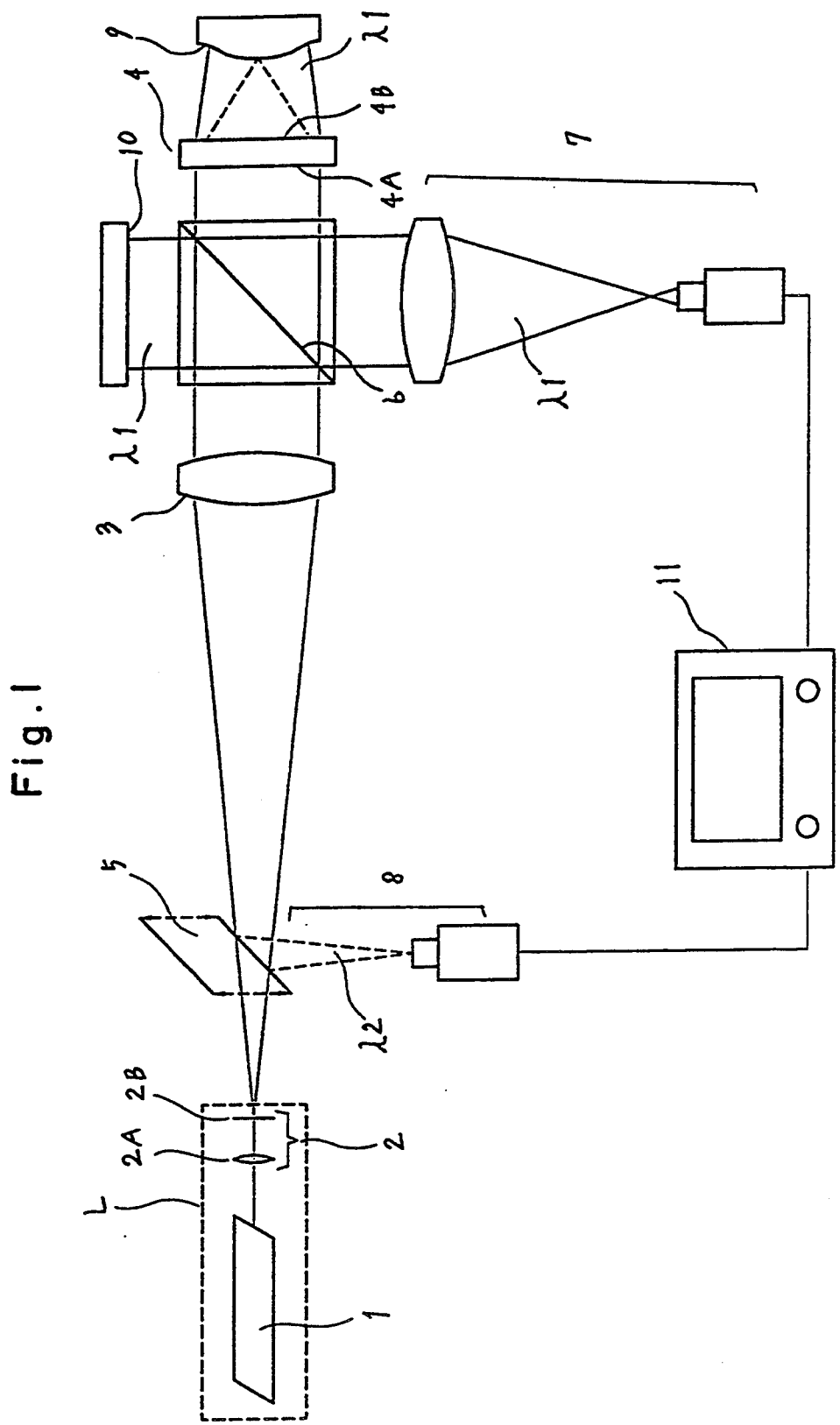
FIG. 1 is a construction diagram of an interferometer of one embodiment of the present invention.

FIG. 1 is a construction diagram of one embodiment of the interferometer of the present invention. This embodiment is equipped with light source unit L, collimator lens 3, measuring wave generating member 4 which generates wave fronts to measure configurations and distances, beam splitters (hereinafter termed BS) 5 and 6, interference pattern observation optical system 7 and alignment observation optical system 8. Further, 9 is a test surface, 10 is a reference surface and 11 is a TV monitor in the drawing.

Light source unit L comprises laser 1 having two or more oscillation wavelengths and spatial filter 2. Among the oscillation wavelengths, two are deemed as $\lambda 1$ and $\lambda 2$. BS5 functions as a half mirror to the light of wavelength $\lambda 2$ and transmits light of wavelength $\lambda 1$. BS6 functions as a half mirror to the light of wavelength $\lambda 1$ and transmits light of wavelength $\lambda 2$. On measuring wave generating member 4, for example, zone plates 4A and 4B are formed on either side of the glass, respectively. Zone plate 4A generates a spherical wave front which converges on the predetermined measuring position for the test surface upon the incidence of a collimated beam of wavelength $\lambda 2$, and zone plate 4B generates a configuration measuring wave front for the measurement of the configuration of the design surface upon the incidence of a collimated beam of wavelength $\lambda 1$.

First, after being emitted from light source unit L, light of wavelength $\lambda 1$ passes through BS5 and is split by BS6 into a reflected beam and a transmitted beam. Of these, the transmitted beam becomes a configuration measuring wave front corresponding to the configuration of the test surface by means of zone plate 4B. If test surface 9 is constructed in the configuration as designed and is located at the predetermined measuring position, the measuring wave is reflected by test surface 9 and advances backward into BS6 along the path it originally traveled. A part of the beam incident into BS6 becomes reflected and reaches interference pattern observation optical system 7. On the other hand, of the light of wavelength $\lambda 1$ emitted from light source unit L, the beam which was first reflected by BS6 becomes reflected by reference surface 10 and becomes a reference beam, which again heads to BS6. Some of the reference beam that is transmitted through BS6 enters interference pattern observation optical system 7. Here, in interference pattern observation optical system 7, the reflected beam from the test surface and the reference beam interfere with each other and form an interference pattern, through the analysis of which the configuration error of the test surface may be measured.

Next, after being emitted from light source unit L, the light of wavelength $\lambda 2$ passes through BS5, collimator lens 3 and BS6, and converges by means of zone plate 4A on the optical axis of test surface 9 at the predetermined measuring position. If the convergent light is reflected on test surface 9, it becomes collimated light again by means of zone plate 4A and after passing through BS6 and collimator lens 3, it becomes converged. Of this light, the spot of the convergent beam reflected on BS5 is observed using alignment optical system 8. When doing this, if the test surface is not positioned at the predetermined measuring position, the position of the spot of the convergent beam also becomes displaced and a sufficiently small spot is not created. In this way, it can be confirmed whether or not the test surface is properly set at the predetermined measuring position and any displacement may be adjusted.

When measuring test surface 9 using the interferometer of this embodiment, in order to properly position test surface 9 at the predetermined measuring position, first, light of wavelength $\lambda 2$ is emitted, the convergent spot is observed using alignment optical system 8, and the positioning of test surface 9 is performed. Once the positioning of test surface 9 along the optical axis is completed, then light of wavelength $\lambda 1$ is emitted, and while observing the interference pattern through interference pattern observation optical system 7, the tilt of test surface 9 is adjusted so that the interference pattern becomes one color or a condition closest to it. The configuration of test surface 9 is then measured based on the interference pattern at that point in time.

Light source unit L may be constituted with two LDs which emit different wavelengths and with an intercepting means to intercept the emission of the lasers or the advancement of the beams. Further, if it is difficult to design and construct BS5 and BS6 to respond differently to two wavelengths, they may be constituted such that they function as half mirrors to either wavelength.

Next, the construction of each member is described in detail.

Light source unit L comprises multi-color He-Ne laser 1 having oscillation wavelengths of 543 nm, 604 nm, 633 nm, etc. and spatial filter 2 comprising condenser lens 2A and pinhole 2B. For laser 1, a semiconductor laser whose oscillation wavelength changes via injection current may be used. Collimator lens 3 is designed such that the aberration regarding the wavelengths of the configuration measuring light and the alignment light may be ignored. Clear plates having prescribed patterns are used for zone plate 4.

Figure 2A:
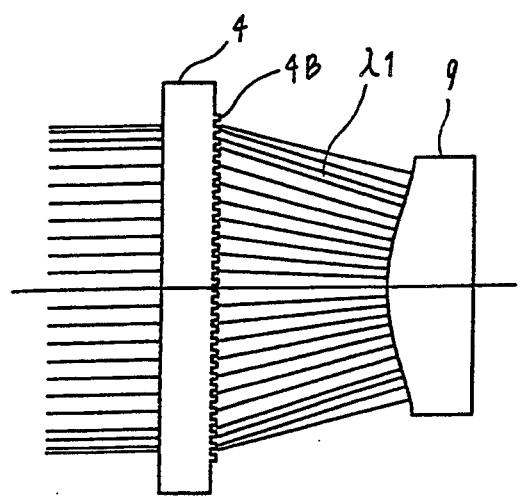
FIG. 2(a), FIG. 2(b), and FIG. 2(c) are explanatory drawings regarding the determination of a zone plate pattern.
Figure 2B:
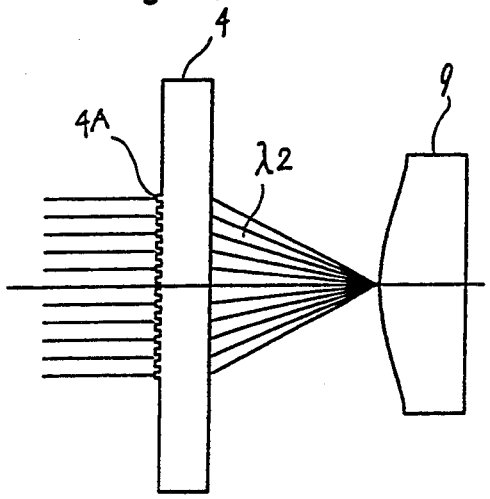
Figure 2C:
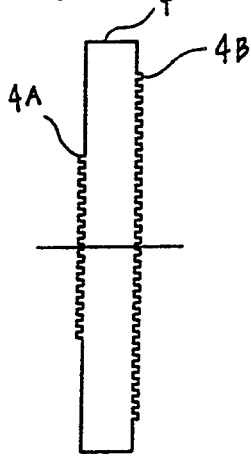
Figure 3:
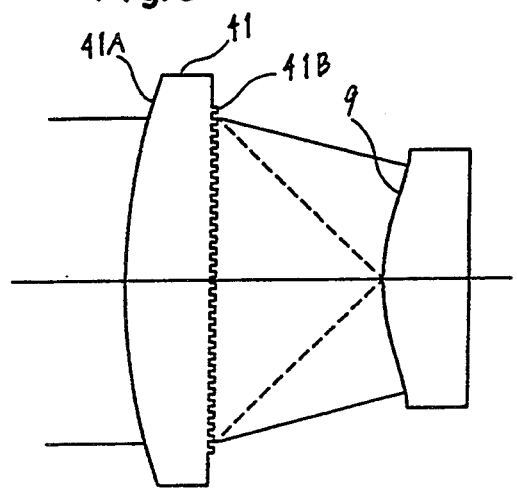
FIG. 3 is a cross-sectional view of an optical element which is curved on one side.

In the design of configuration measuring pattern 4B, as shown in FIG. 2a, the distances between points on test surface 9 and points on the clear plate along a normal line extending from each point on test surface 9 toward the clear plate are sought, and the zone pattern is determined such that the phases match. In the design of alignment pattern 4A, as shown in FIG. 2b, the zone pattern is determined so that the phases between a point on the optical axis of test surface 9 and points on the clear plate match. Needless to say, the diffraction which occurs when the alignment light passes through the clear plate is taken into consideration. Thus, as shown in FIG. 2c, optical element 4 on which configuration measuring pattern 4B and alignment pattern 4A are formed on respective surfaces can be formed. For the patterns, phase type is more desirable than amplitude type. Because BS5 is needed only for alignment, if it is designed such that it retracts away from the light when the configuration is measured, the aberration which occurs when the light passes BS5 exerts no influence on the measurement of the configuration.

It is also possible to generate alignment light not by using patterns, but by providing a curvature on one side 41A of clear plate 41 so that the convergent spot forms on test surface 9 through the refractive power of the curved surface. If this construction is used, the inconvenience of making patterns on both sides may be avoided and the unnecessary diffracted beam by the alignment pattern does not exert an undesired influence on the interference pattern. However, when designing configuration measuring pattern 41B, the refraction of light passing through this curved surface must be taken into consideration.

Figure 4A:
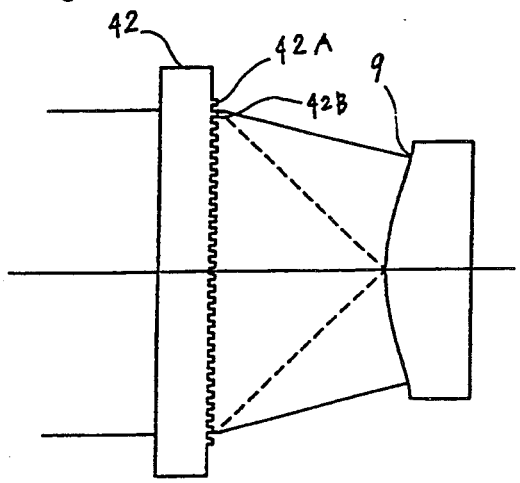
FIG. 4(a) and FIG. 4(b) are cross-sectional views of an optical element on which two patterns are formed on the same surface.
Figure 4B:
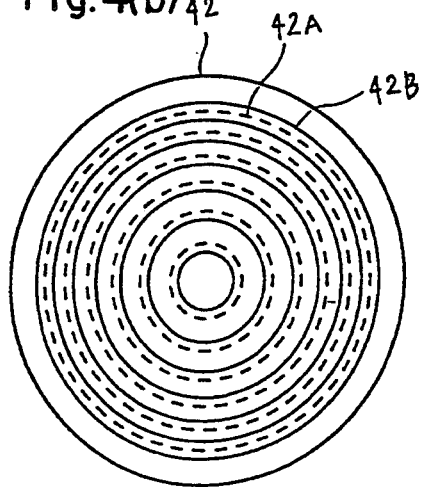
Figure 5A:
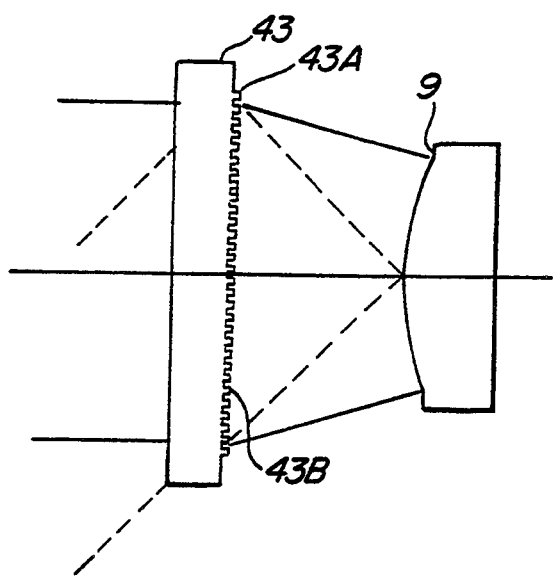
FIG. 5(a) and FIG. 5(b) are cross-sectional views of an optical element which makes one beam incident from an angle.
Figure 5B:
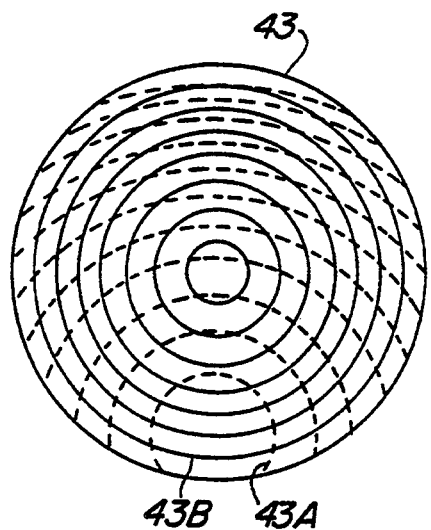

Further, as shown in FIG. 4a, optical element 42 on which configuration measuring pattern 42B and alignment pattern 42A are drawn overlapped on the same surface may be used. In consideration of the photolithography process, it is easier to form patterns on one side only. However, as shown in FIG. 4b, if the configuration measuring pattern and alignment pattern are drawn concentrically, the two patterns overlap each other, which makes the zones more susceptible to collapse. Therefore, it is conceivable to increase the difference in wavelength between the configuration measuring light and alignment light and shift the two pattern pitches. It is also possible, as shown in FIG. 5a, to have the alignment light be incident from an angle different from the optical axis of the configuration measuring light. When this is done, the patterns on optical element 43 become eccentric as shown in FIG. 5b.

Figure 6A:
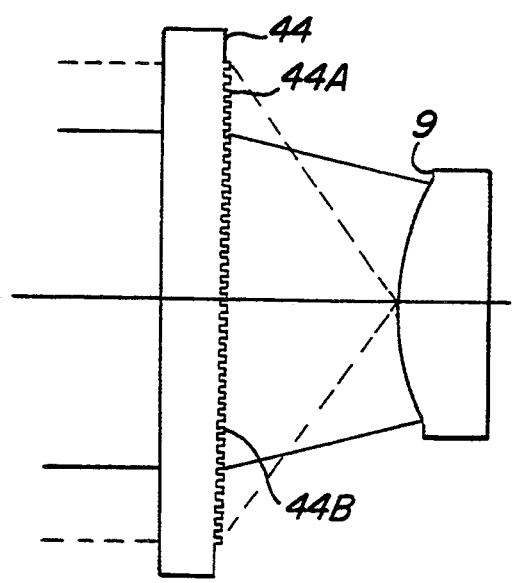
FIG. 6(a) and FIG. 6(b) are cross-sectional view of an optical element on which another pattern is formed outside the area of one pattern.
Figure 6B:
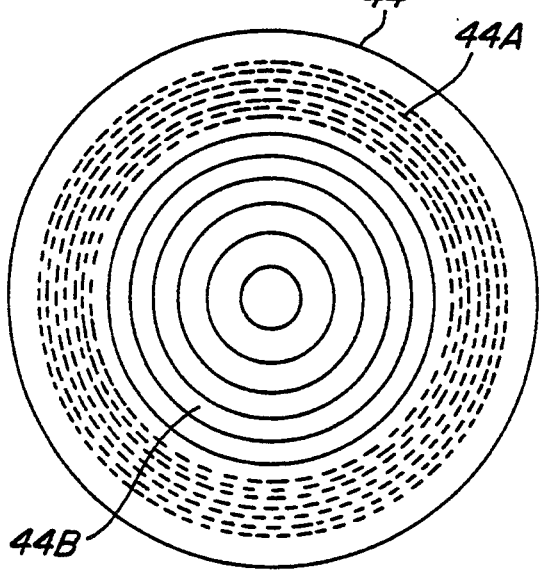

When the two patterns are drawn in the same area, the incident light becomes diffracted by the two patterns and the diffraction efficiency of the configuration measuring light or alignment light is reduced. Therefore, where diffraction efficiency is an issue, optical element 44 on which the two patterns are drawn in different areas on the same surface or on each side may be used. For example, as shown in FIG. 6(a) and FIG. 6(b), if alignment pattern 44A is formed outside the area of configuration measuring pattern 44B, and a shutter disc (not shown in the figure) is located at the center of the optical axis in alignment optical system 8 such that only the light passing through alignment pattern 44A may be taken in, observation can be performed with adequate contrast even if the luminescence of the spot is reduced.

Further, as shown in FIG. 7(a) and FIG. 7(b), an optical system may be used in which optical element 45, on which ring-like alignment pattern 45A is formed outside of the area of configuration measuring pattern 45B, is employed such that the light of the incident beam which comes into area 45C, a part of pattern 45A, and which becomes diffracted is reflected at the vertex of the test surface, and the outgoing beam follows a path different from that for the incoming beam (diffracted by area 45D). In this construction, the diameter of the convergent spot and degree of oscillation of the outgoing beam are observed in alignment optical system 8.

Further, as shown in FIG. 8, the configuration measuring pattern and alignment pattern may be switched on the clear plate by forming the zones using liquid crystal phase gratings 46A and 46B and controlling the distribution of impressed voltage V. Moreover, if the electrode patterns are constructed with extreme precision, generation of several configuration measuring waves with one plate is possible by electrically changing the configuration measuring pattern.

Figure 9:
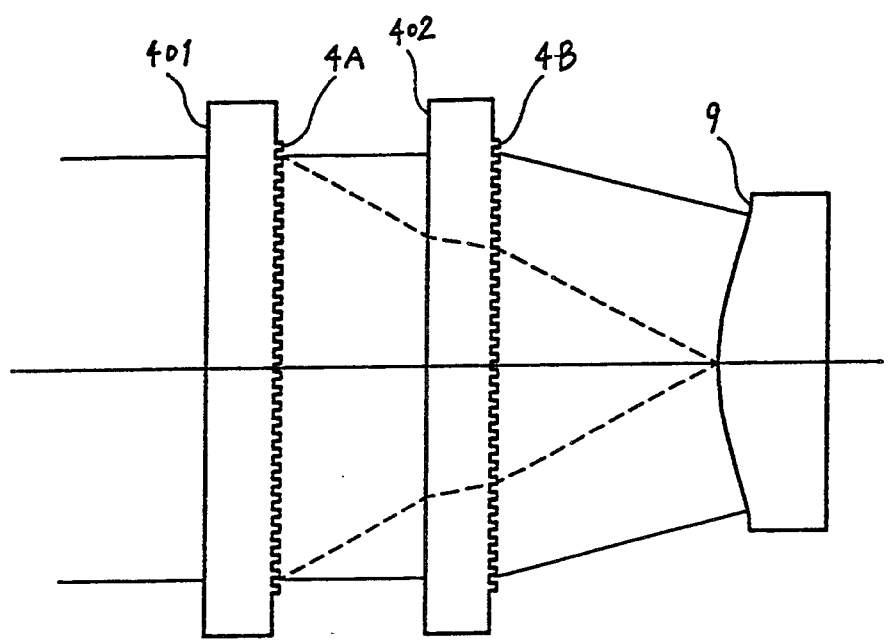
FIG. 9 is an explanatory drawing of an embodiment in which two different patterns are formed on two different optical elements.

In addition, while the configuration measuring pattern and alignment pattern are formed on one optical element in the above embodiment, if, as shown in FIG. 9, patterns 4A and 4B are formed on optical elements 401 and 402, respectively, the process of photolithography may be simplified. Also, while in the above embodiment, as members to generate the configuration measuring wave front and alignment wave front, optical elements 401 and 402 having a pattern are employed, if an optical element having a prescribed curvature is used as one of the members, particularly as the member to generate the alignment wave front, it becomes no longer necessary to integrate an optical element having a complex configuration.

Furthermore, the above embodiment uses a method in which the measurement of the configuration is performed after the test surface is set at the predetermined measuring position by the alignment optical system, but the configuration of the interferometer may be changed such that the following method may be employed: (a) the test object is moved while the condition of the interference pattern is observed by a configuration measuring wave and at the point where the condition of the pattern becomes optimal, in other words, at the point where the test object coincides with one of the innumerable virtual configurations, the analysis of the pattern is performed (as mentioned above, the interference pattern obtained here includes displacement of the test surface and the error of the test surface from the design configuration); (b) the degree of displacement of the test surface from the predetermined measuring position is measured using the alignment optical system; and (c) the displacement is corrected and only the test surface's error from the design configuration is extracted. A system which employs this method is particularly effective when measuring test objects with large configuration errors.

Because the interferometer of the present invention performs positioning of the test surface to the predetermined measuring position using the beam of the wave front converging at the predetermined measuring position and reflected by the test surface, in spite of its very simple construction, 'the discrepancy between the test surface configuration and the design configuration' can be measured in a condition where there is no displacement error from the predetermined measuring position.

In addition, by integrating the means to generate two wave fronts on one optical element, an increase in the number of components can be avoided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An interferometer for measuring a surface configuration of a test object by an interference pattern, comprising:
    a light source;
    means for dividing a beam from the light source into two beams, and for guiding one beam to a reference surface as a reference beam and the other beam to a test surface of a test object as a measuring beam;
    a single optical element with two grating patterns, said single optical element generating a first wave front as a test beam corresponding to design configuration of the test surface by passing the measuring beam through one of the grating patterns and generating a second wave front which converges on a predetermined measuring position for the test surface by passing the measuring, beam through the other grating pattern;
    means for detecting a difference between the predetermined measuring position and the test surface on the basis of the second wave front reflected by the test surface; and
    means for measuring the test surface configuration by an interference pattern with the reference beam reflected by the reference surface and the test beam reflected by the test surface, after positioning the test surface to the predetermined measuring position on the basis of the detected difference.

2. An interferometer as claimed in claim 1, wherein the first wave front is aspherical wave front and the second wave front is spherical wave front, and wherein the interferometer measures an aspherical test surface.

3. An interferometer as claimed in claim 1, wherein the second wave front converges on vicinity of an optical axis of the test surface at the predetermined measuring position.

4. An interferometer as claimed in claim 1, wherein the optical element is a zone plate.

5. An interferometer for measuring a surface configuration of a test object by an interference pattern, comprising:
    a light source;
    means for dividing a beam from the light source into two beams, and for guiding one beam to a reference surface as a reference beam and the other beam to a test surface of a test object as a measuring beam;
    a single optical element with two grating patterns, said single optical element generating a first wave front as a test beam corresponding to a design configuration of the test surface by passing the measuring beam through one of the grating patterns and generating a second wave front which converges on a predetermined measuring position for the test surface by passing the measuring beam through the other grating pattern;
    means for detecting a difference between the predetermined measuring position and the test surface on the basis of the second wave front reflected by the test surface;
    means for measuring the test surface configuration by an interference pattern with the reference beam reflected by the reference surface and the test beam reflected by the test surface; and
    means for correcting the measuring result on the basis of the detected difference.

6. An interferometer for measuring a surface configuration of a test object relative to a reference surface by an interference pattern, comprising:
    a light source means for providing a measuring beam and an alignment beam;
    means for dividing the measuring beam so that it is directed at, respectively, a test object surface and a reference surface;
    means for measuring the test surface configuration from reflections of the measuring beam from the test object surface and the reference surface;
    an optical element positioned adjacent the test object, including a first wave front generating means for directing the measuring beam to the test object surface and a second wave front generating means for directing the alignment beam to the test object surface; and
    means for detecting a difference between a predetermined measuring position and the test object surface based on the second wave front reflected by the test object surface so that the interferometer can be aligned prior to a measurement of the test object surface.

* * * * *